United States Patent [19]

Fujikawa et al.

[11] 4,155,414
[45] May 22, 1979

[54] SNOW MOBILE INCLUDING AN IMPROVED AIR CLEANER

[75] Inventors: Tetsuzo Fujikawa, Kobe; Toshiyuki Takada, Miki, both of Japan

[73] Assignee: Kawasaki Jukogyo Kabushiki Kaisha, Kobe, Japan

[21] Appl. No.: 869,350

[22] Filed: Jan. 13, 1978

[30] Foreign Application Priority Data

Jan. 13, 1977 [JP] Japan .............................. 52/3553[U]

[51] Int. Cl.$^2$ ...................... B62M 27/02; B01D 50/00
[52] U.S. Cl. ........................................ 180/5 R; 55/276;
55/319; 55/385 B; 55/DIG. 28; 296/63;
297/217; 180/54 A
[58] Field of Search .................... 55/276, 319, 385 B,
55/DIG. 28; 98/2.11; 180/5 R, 54 A; 296/63;
297/217

[56] References Cited

U.S. PATENT DOCUMENTS

| 3,698,503 | 10/1972 | Koyama | 55/385 B |
| 3,796,027 | 3/1974 | Gumtow | 55/DIG. 28 |
| 4,008,777 | 2/1977 | Juto et al. | 180/54 A |

FOREIGN PATENT DOCUMENTS 2329662  1/1975  Fed. Rep. of Germany ......... 55/385 B Primary Examiner—Frank W. Lutter
Assistant Examiner—David L. Lacey
Attorney, Agent, or Firm—C. Bruce Hamburg

[57] ABSTRACT

An air cleaner for an engine of a snow mobile provided with an endless vehicle track driven by the engine, includes an air cleaner main body comprising a duct extending longitudinally of the snow mobile and disposed on a floor covering of the endless vehicle track. The air cleaner main body is connected at its forward end to a carburetor for the engine and includes a rearward portion formed with a plurality of air inlet apertures. A riders' seat is mounted on the rear portion of the air cleaner main body and includes a shock-absorbing member for enclosing the air inlet apertures and an outer cover member for covering the shock-absorbing member. The shock-absorbing member serves concurrently as a cleaning element of the air cleaner, and at least one air intake port is formed in the outer cover of the seat at its rear end or one or both of its sides. The air cleaner main body is formed with an increased volume section which serves as a muffler for silencing engine intake noises.

6 Claims, 4 Drawing Figures

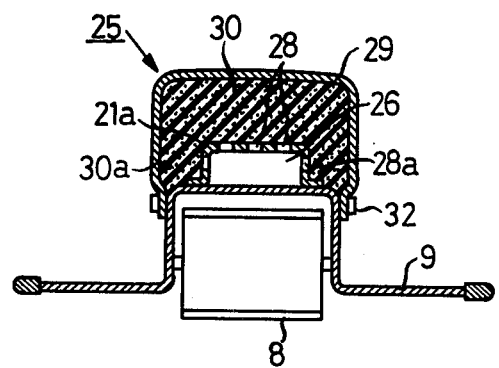
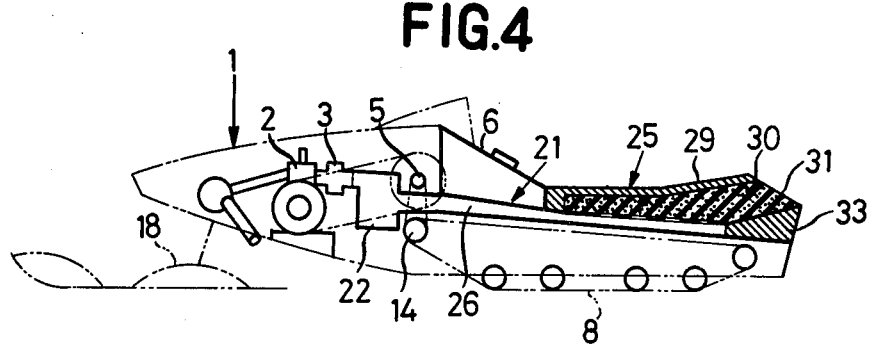

A SNOW MOBILE INCLUDING AN IMPROVED AIR CLEANER

BACKGROUND OF THE INVENTION

This invention relates to air cleaners for engines, and more particularly to an air cleaner for an engine of a snow mobile.

Air cleaners for engines of the prior art have hitherto had many disadvantages because of the fact their air cleaning elements are small in volume. It has hitherto been impossible to increase the volume of a cleaning element of an air cleaner because the air cleaner has to be mounted in a limited space together with other equipment of the snow mobile.

SUMMARY OF THE INVENTION

An object of this invention is to provide an air cleaner for a snow mobile engine obviating the aforementioned disadvantages of the prior art, which has a large volume and includes a cleaning element of a large volume, so that removal of dust particles from the air introduced into the engine can be effected satisfactorily to enable the engine to develop high power both in a high engine speed range and in a low engine speed range.

Another object is to provide an air cleaner comprising a duct for a snow mobile engine which includes an increased volume section so that the air cleaner can concurrently perform the function of silencing engine intake noises which may occur in an intake port of the engine when a fuel-air mixture is introduced into the engine.

This invention has been developed to provide an air cleaner for a snow mobile engine by utilizing as a cleaning noise silencing element a shock-absorbing member made of soft foamed polyurethane, for example, which is mounted, for improving riding comfort, beneath the cover member of a seat which is large enough to enable at least one rider to sit thereon. The shock-absorbing member forms a part of the volume of the air cleaner so as to increase the overall volume of the air cleaner.

According to the invention, there is provided an air cleaner for a snow mobile engine comprising an air cleaner main body extending longitudinally of the snow mobile on a floor thereof and connected at its forward end to a carburetor, a plurality of air inlet apertures formed in the main body, a shock-absorbing member of a seat enclosing the air inlet apertures and serving as a cleaning element for removing dust particles from the air introduced into the carburetor, and at least one air intake port formed in the seat.

Additional objects, features and advantages of the invention will become evident from the description set forth hereinafter when considered in conjunction with the accompanying drawings.

BRIEF DESCRIPTION OF THE DRAWINGS

FIG. 3 is a sectional view taken along the line III—III in FIG. 2; and

FIG. 4 is a view similar to FIG. 2 but showing another embodiment of the invention.

DETAILED DESCRIPTION OF THE PREFERRED EMBODIMENTS

To enable the present invention to be thoroughly understood, an air cleaner of the prior art for a snow mobile engine will be described by referring to FIG. 1.

Figure 1:
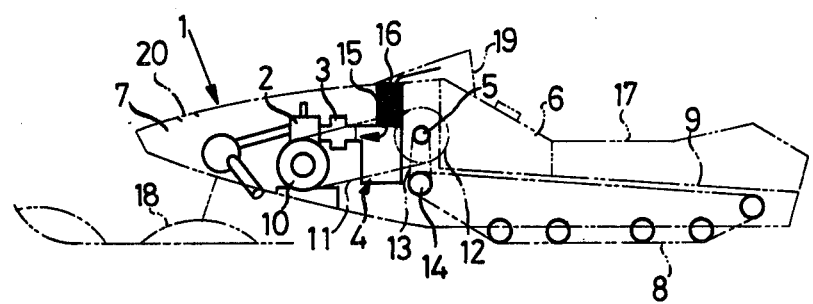
FIG. 1 is a schematic vertical sectional left side view of a snow mobile showing one example of constructions of the prior art.

In FIG. 1, a snow mobile 1 includes an engine compartment 7 disposed in its forward portion, and a tunnel-shaped floor 9 disposed rearwardly of the engine compartment 7 (rightwardly in FIG. 1) and extending longitudinally of the snow mobile 1 to cover an endless vehicle track 8. The numeral 2 designates an engine mounted in the engine compartment 7 and having a crankshaft which extends widthwise of the snow mobile 1 or in a direction perpendicular to the plane of FIG. 1 and mounts at its forward end a drive pulley 10 of a V-belt transmission. The numeral 11 designates a V-belt, and the numeral 12 designates a driven pulley mounted on an intermediate shaft 5. The numeral 13 designates a chain trained over the intermediate shaft 5 and a drive shaft 14 for the endless vehicle track 8. The numeral 3 is a carburetor for the engine 2, and the numeral 4 is an air cleaner connected to the carburetor 3.

The air cleaner 4 includes a box-shaped main body, an air cleaning element 15 mounted in an upper portion of the main body for removing dust particles from the air introduced into the carburetor 3 and silencing engine intake noises, and air intake port 16 at the upper end of the main body.

In some cases, the air intake port 16 is connected to a louver in the outer plate of the snow mobile body. The numeral 6 designates a fuel tank; the numeral 17, a rider's seat; the numeral 18, a steering sled operated by a steering wheel; the numeral 19, a dashboard; and the numeral 20, a cooling air inlet port.

As can be seen in FIG. 1, it has hitherto been impossible for the air cleaner 4 to occupy a large space in the snow mobile because other parts, such as the intermediate shaft 5, fuel tank 6 and dashboard 19, must be mounted. Thus it has hitherto been impossible for the cleaning element 15 for removing dust particles from the air to have a sufficiently large volume for achieving satisfactory results in cleaning the air introduced into the carburetor 3.

An engine which is required to develop high power and operate at high speed, such as an engine for a snow mobile, must be provided with an air cleaner of a sufficiently large volume to meet the requirements of the engine. It this is not the case, the air cleaner offers resistance to the performance of the engine in the high engine speed range, and an increase in the volume of air intake is not expected. Consequently the engine is not capable of developing high power. In addition to the problem described hereinabove, a two-cycle engine encounters the problem of the air-fuel ratio becoming smaller (the mixture is enriched) due to a so-called pre-firing phenomenon occuring in the low speed range, if the air cleaner is small in volume. This causes a reduction in the power developed by the engine and an increase in fuel consumption.

The main object of providing an air cleaner is to remove dust particles from the air introduced into the carburetor. If the air cleaning element has a small volume, it is impossible to accomplish this object satisfactorily. The air cleaning element will be obturated in a short period of time and become unable to perform its function. This raises a problem with regard to maintenance, because inspection and cleaning must be often performed.

The air cleaner is required to perform another function, or the function of silencing engine intake noises. It is quite natural that if an air cleaner is small in volume, this function is not performed satisfactorily. Moreover, if the air cleaner 4 is mounted in the rear portion of the engine compartment 7 as shown in FIG. 1, the air heated by the engine 2 tends to be sucked into the air cleaner 4, thereby reducing the volume efficiency of the engine 2. The air sucked into the carburetor 3 shows a change in temperature with time after the engine is started, thereby resulting in variations in the performance of the engine 2. As a result, a problem is encountered with regard to the setting of the carburetor 3 for an air fuel ratio.

Figure 2:
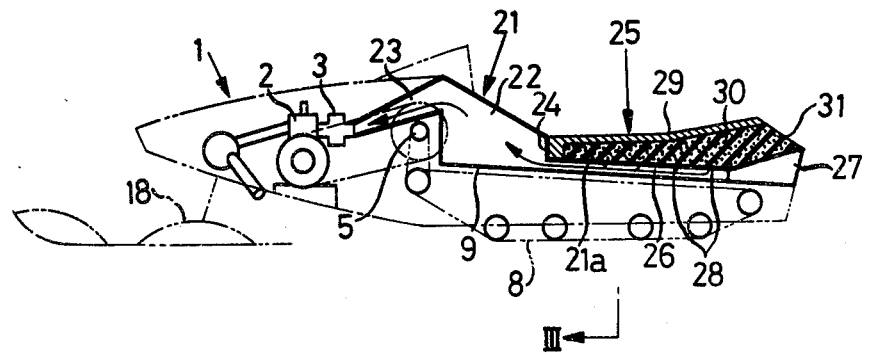
FIG. 2 is a schematic vertical sectional left side view of the snow mobile comprising one embodiment of the present invention.

FIG. 2 shows one embodiment of the present invention.

In FIG. 2, parts similar to those shown in FIG. 1 are designated by like reference characters.

In FIG. 2, there is shown a snow mobile incorporating therein the present invention. An air cleaner main body shown at 21, which is an elongated duct, extends longitudinally of the snow mobile (from right to left in the figure) by utilizing the floor 9 of the snow mobile as its component part and is connected to the carburetor 3 at its forward end. The air cleaner main body 21 includes an increased volume section 22 formed in the position in which a fuel tank is disposed in a snow mobile of the prior art and has substantially the same shape as the fuel tank. The air cleaner main body 21 further includes an air passage 23 extending forwardly downwardly from an upper front portion of the increased volume section 22 while keeping away from the intermediate shaft 5. The main body 21 has an offset portion 24 against which a seat 25 of the snow mobile abuts at its forward end. The main body 21 further includes a rearward tunnel-shaped portion 21a extending rearwardly from the offset portion 24 and having its side walls bent outwardly to provide outwardly extending horizontal portions as shown in cross-section FIG. 3. The outwardly extending horizontal portions of the portion 21a are joined as by spot welding to the floor 9 to provide another air passage 26 which is closed at its rearward end by a fuel tank 27 mounted on the floor 9. The rearward portion 21a of the main body 21 between the offset portion 24 and the fuel tank 27 is formed with a multitude of air inlet apertures 28 for introducing air into the air cleaner. The numeral 28a in FIG. 3 designates air inlet apertures formed in side walls of the rearward portion 21a. It is to be understood that air inlet apertures may be formed in the offset portion 24.

The seat 25 includes a leather member 29 in the form of an inverted letter U in cross section, and a shock-absorbing member 30 covered by the leather member 29 and stuffed in the seat 25. The seat 25 has no leather member 29 to cover the shock-absorbing member 30 at its rear end to provide an air intake port 31. The shock-absorbing member 30 is formed of a soft foamed body consisting of a multitude of air-permeable bubbles, such as foamed polyurethane. In forming the seat 25, the leather member 29 shaped in desired form may be arranged in a pattern and polyurethane in liquid form may be poured in the shaped leather member 29 to cause the polyurethane to form a foam inside the leather member 29. In this way, the leather member 29 and the shock-absorbing member 30 can be joined together. Thus the seat 25 has a construction such that its upper surface and opposite sides are covered with the leather member 29, and the shock-absorbing member 30 is exposed at the air intake port 31 at its rearward end and at its underside. The seat 25 can be fixed in place in the snow mobile by placing the seat 25 on the rearward portion 21a of the cleaner main body 21 and causing buttons 32 (see FIG. 3) at lower marginal portions of the leather member 29 to be attached to fasteners mounted at side walls of the floor 9.

While the engine is in operation, the air introduced through the air intake port 31 has dust particles removed as it passes through the shock-absorbing member 30, and clean air is led through the air inlet apertures 28, 28a into the rearward portion 21a of the air cleaner main body 21, where the air passes through the air passage 26, increased volume section 22 and air passage 23 to the carburetor 3. The noise produced in the engine 2 is diffused and its energy is greatly reduced as it is introduced through the air passage 23 into the increased volume section 22. The major part of the energy of the noise is absorbed by the main body 21 while passing through the rearward passage 26 which is narrow and the shock-absorbing member 30.

From the foregoing description, it will be appreciated that according to the present invention, the air cleaner main body 21 extends longitudinally of the snow mobile on the floor 9 covering the endless vehicle track 8 and includes the rearward portion 21a formed with a multitude of air inlet apertures 28 and having the seat 25 disposed thereon so that the air inlet apertures 28 may be enclosed by the shock-absorbing member 30 of the seat 25, and the seat 25 is formed with the air intake port 31. By this arrangement, the air cleaner has its volume greatly increased as compared with air cleaners of the prior art, and the shock-absorbing member 30 functions as a cleaning element of large volume. This reduces the resistance offered by the air cleaner to the inflow of air currents, thereby making it possible to increase the quantity of air taken into the carburetor and to increase the power developed by the engine. Even if the engine mounted on the snow mobile is a two cycle engine, which raises the problem of prefiring, the possibility of the air-fuel ratio of the fuel-air mixture supplied to the engine being reduced is eliminated, so that it is possible to avoid a lowering of the power developed by the engine and an increase in fuel consumption. Since the shock-absorbing member 30 has a large volume, it can achieve excellent results in removing dust particles from the air introduced through the air intake port 31. Moreover, the need to mount a special intake noise silencer (such as a resonator pipe) as required in the case of a conventional air cleaner is eliminated and yet the air cleaner can achieve excellent results by functioning concurrently as a noise silencer. Thus the air cleaner according to the invention is economical.

The provision of the air inlet apertures 28a in the side walls of the rearward portion 21a of the air cleaner main body 21 permits portions 30a of the shock-absorbing member 30 disposed adjacent the air inlet apertures 28a to perform a satisfactory air filtering action when riders on the seat 15 are heavy in weight, thereby enabling the engine to show stable performance. If the effective area of each of the apertures 28 and 28a is increased in going toward the forward end of the snow mobile or the distribution density of the apertures 28 and 28a is increased in going toward the forward end of the snow mobile, it is possible to equalize the resistance offered to air currents from the air inlet port 31 to each air inlet aperture 28 and 28a and to render uniform the air currents. This makes it possible to utilize all the shock-absorbing member 30 effectively and uniformly in removing dust particles from the air introduced into the carburetor 3 and silencing engine intake noises. It is to be understood that the air intake port 31 may be formed in one or both of the side walls of the leather member 29.

FIG. 4 shows another embodiment in which the fuel tank 6 is mounted in the same position that it is mounted in a conventional snow mobile, and the air passage 26 of the air cleaner main body 21 extends forwardly between the intermediate shaft 5 and the drive shaft 14 to be connected to the increased volume section 22. The numeral 33 designates a seal. The embodiment shown in FIG. 4 offers the advantage of being able to reduce the length of piping for supplying the fuel to the carburetor 3.

What is claimed is:

1. In a snow mobile having a seat and an engine including a carburetor and an air cleaner, the improvement wherein said air cleaner comprises:
    an air cleaner main body extending longitudinally of the snow mobile on a floor thereof and connected at its forward end to the carburetor;
    a plurality of air inlet apertures formed in the air cleaner main body;
    said seat having a shock-absorbing member overlying said main body and enclosing the aperture and serving as a cleaning element for removing dust particles from the air introduced into the carburetor, said shock-absorbing member comprising a filter material which is effective for filtering air; and
    at least one air intake port formed in the seat, said shock-absorbing member being interposed between said port and said apertures for filtering the air as it travels from said port to said apertures.

2. A snow mobile as claimed in claim 1, wherein said air cleaner main body comprises a duct extending longitudinally of the snow mobile beneath said shock-absorbing member.

3. A snow mobile as claimed in claim 1, wherein said air cleaner main body is formed with at least one increased volume section for silencing noises.

4. A snow mobile as claimed in claim 1, wherein said plurality of air inlet apertures are formed in an upper wall and side walls of a rearward portion of the air cleaner main body.

5. A snow mobile as claimed in claim 1, wherein said plurality of air inlet apertures have their effective area increased in going toward the forward end of the snow mobile.

6. A snow mobile as claimed in claim 1, wherein said plurality of air inlet apertures is arranged in a distribution density which increases in going toward the forward end of the snow mobile.

* * * * *